United States Patent
Ueno et al.

(10) Patent No.: US 7,874,736 B2
(45) Date of Patent: Jan. 25, 2011

(54) OIL-LUBRICATED ROLLER BEARING ASSEMBLY

(75) Inventors: Hiroshi Ueno, Tondabayashi (JP); Hiroki Matsuyama, Nara (JP); Hiroyuki Chiba, Kashiwara (JP); Seiji Nakahama, Osaka (JP)

(73) Assignee: JTEKT Corporation, Osaka (JP)

( * ) Notice: Subject to any disclaimer, the term of this patent is extended or adjusted under 35 U.S.C. 154(b) by 284 days.

(21) Appl. No.: 11/883,771

(22) PCT Filed: Feb. 15, 2006

(86) PCT No.: PCT/JP2006/302622
§ 371 (c)(1), (2), (4) Date: Aug. 6, 2007

(87) PCT Pub. No.: WO2006/088044
PCT Pub. Date: Aug. 24, 2006

(65) Prior Publication Data
US 2009/0123103 A1    May 14, 2009

(30) Foreign Application Priority Data
Feb. 15, 2005    (JP) .............................. 2005-037348

(51) Int. Cl.
*F16C 33/34* (2006.01)
*F16C 33/58* (2006.01)

(52) U.S. Cl. ..................... 384/565; 384/567; 384/571; 384/907

(58) Field of Classification Search ................. 384/565, 384/567, 571, 574, 907; *F16C 33/34*
See application file for complete search history.

(56) References Cited

U.S. PATENT DOCUMENTS

| | | | | |
|---|---|---|---|---|
| 2,215,701 A | * | 9/1940 | Henselman | 384/565 |
| 2,231,350 A | * | 2/1941 | Ringle | 384/574 |
| 4,776,710 A | * | 10/1988 | Hara | 384/565 |

FOREIGN PATENT DOCUMENTS

| | | | |
|---|---|---|---|
| JP | 142776 C2 | | 6/1941 |
| JP | 1981-131021 A | | 10/1981 |
| JP | 63-225729 A | | 9/1988 |
| JP | 5-75520 U | | 10/1993 |
| JP | 7-14222 U | | 3/1995 |
| JP | 2002-61655 A | | 2/2002 |
| JP | 2003-156056 A | | 5/2003 |
| JP | 2003156056 A | * | 5/2003 |
| JP | 2004-176771 A | | 6/2004 |

* cited by examiner

*Primary Examiner*—Thomas R Hannon
*Assistant Examiner*—Phillip A Johnson
(74) *Attorney, Agent, or Firm*—Birch, Stewart, Kolasch & Birch, LLP

(57) ABSTRACT

A roller bearing assembly is provided which is adapted to enhance lubrication performance for preventing seizure and for reducing frictional torque during rotation. The roller bearing assembly includes an inner ring (1), an outer ring (2) and a roller (3) rollably interposed between these inner and outer rings. The inner ring (1) is formed with a rib (4) making contact with a greater end face (7) of the roller (3) for guiding the rolling motion of the roller (3). A recess (5) is formed centrally of the greater end face (7) of the roller (3). A stopper member (6) for preventing oil invasion is fitted in the recess (5) of the roller (3).

13 Claims, 5 Drawing Sheets

OIL-LUBRICATED ROLLER BEARING ASSEMBLY

TECHNICAL FIELD

The present invention relates to an oil-lubricated roller bearing assembly.

BACKGROUND ART

As shown in FIG. 5, a roller bearing assembly includes: an inner ring 1; an outer ring 2; and a roller 3 as a rolling element rollably interposed between these inner and outer rings. The inner ring 1 is formed with a rib 4 which makes contact with an end face (greater end face) of the roller 3 for guiding the rolling motion of the roller 3. And a recess 5 is formed centrally of the end face of the roller 3. The recess 5 is formed from both a standpoint of manufacturing the roller 3 and a performance standpoint of the bearing assembly in use. That is, as to the manufacture standpoint, the recess 5 is effective to solve the following problems. If the end face of the roller is not formed with the recess 5 before subjected to grinding, an abrasive stone cannot grind a central portion of the end face, leaving a minor bulge at the central portion. Hence, the subsequent operation of removing the minor bulge is required. What is more, if the minor bulge remains on the end face, it is difficult to establish the roller end face defining a measurement reference plane. This makes it difficult to take measurement on an axial dimension of the roller 3. However, these problems may be solved by forming the recess 5 prior to the grinding process.

As to the performance standpoint, the recess 5 is thought to offer the following advantage. Specifically, the recess 5 stores an oil, which may be supplied to space between the roller end face and the rib 4 by way of centrifugal force associated with the rotation of the roller 3. That is, the recess 5 is designed to serve as an oil reservoir and is thought to be necessary for enhancing lubrication performance.

The conventional roller bearing assemblies have the following constitutions for enhancing the lubrication performance.

As set forth in Japanese Unexamined Patent Publications No. 2004-176771 and No. H7 (1995)-14222, for example, the roller contains a solid lubricant therein. In this constitution, the oil seeping out from an end face of the solid lubricant reduces frictional torque between the rib of the inner ring and the roller. In another constitution set forth in Japanese Unexamined Patent Publication No. 2002-61655, the roller is formed with an axial through-hole and the centrifugal force associated with the rotation of the roller causes the oil (lubricant) to flow through the through-hole so that the oil is supplied to space between the end face of the roller and the rib.

DISCLOSURE OF THE INVENTION

In the conventional constitutions wherein the roller is formed with the hole or recess such as to store the oil, the action of supplying the oil to the rib of the inner or outer ring is effected by the centrifugal force associated with the rotation of the roller. However, the present inventors have revealed that this oil supplying action is ineffective if the quantity of oil is small. That is, the inventors have found that the oil is not supplied to the rib because the surface tension and adhesive power of the oil retain the oil on a bottom or at a corner of the recess formed in the roller end face. Specifically, the inventors made experiments to encounter the roller end face seized on the rib or the increased frictional torque during the rotation of the roller although the oil was present in the recess. The inventors have obtained the following finding. The common knowledge of the prior art that the oil stored in the recess contributes to lubrication between the roller end face and the rib thereby enhancing the lubrication performance does not hold true for the case where the oil is decreased to a small quantity.

Then, in the roller bearing assemblies disclosed in Japanese Unexamined Patent Publications No. 2004-176771 and No. H7 (1995)-14222, the oil seeping out from the solid lubricant is so little that the oil is not supplied to the rib in conjunction with the rotation of the roller. In the roller bearing assembly of Japanese Unexamined Patent Publication No. 2004-176771, in particular, a step is formed between an end face of a roller main body and the end face of the solid lubricant and hence, the surface tension and adhesive power of the oil retain the oil on the step.

Moreover, the roller bearing assembly disclosed in Japanese Unexamined Patent Publication No. H7 (1995)-14222 has the following drawback. The solid lubricant is in contact with the rib so as to be able to enhance a lubricating effect in the early stage of use. However, the solid lubricant is worn with use so that the bearing assembly suffers poor lubrication. Hence, the bearing assembly fails to maintain a good lubrication performance over an extended period of time. The worn solid lubricant entails the formation of a dent in the roller end face so that the oil is retained in the dent due to the surface tension and adhesive power thereof, just as in the bearing assembly of Japanese Unexamined Patent Publication No. 2004-176771.

The roller bearing assembly disclosed in Japanese Unexamined Patent Publication No. 2002-61655 also has a similar problem. In a case where the quantity of oil is small, the surface tension and adhesive power of the oil overcome the centrifugal force associated with the rotation of the roller so that the oil is not supplied to the rib but accumulates in the through-hole. Even if the oil is present in a substantial quantity, the oil passed through the through-hole by the centrifugal force associated with the rotation of the roller is spurted out from the linear hole with a velocity component in an axial direction of the roller. Thus, the existence of the through-hole makes it difficult to drive the oil into movement along the roller end face for proper oil supply to space between the roller end face and the rib.

Another problem is encountered by the roller bearing assemblies of Japanese Unexamined Patent Publications No. 2004-176771 and No. H7 (1995)-14222 wherein the solid lubricant is exposed and by the roller bearing assembly of Japanese Unexamined Patent Publication No. 2002-61655 which includes the through-hole involving the oil accumulation. There is a tendency that the oil causes foreign substances such as wear particles to adhere to or accumulate on the exposed surface (the end face of the solid lubricant) and the through-hole of the roller. If the recess 5 exists in the end face of the roller 3, the surface tension and adhesive power of an oil 42 causes the oil 42 and foreign substances 43 to accumulate in the recess 5, as shown in FIG. 6.

If the foreign substances accumulated to form a substantial mass is supplied to space between the roller end face and the rib along with the seeping oil or spurted oil, the foreign substance mass may cause damage on the raceway or increase resistance on the raceway. As a result, the bearing assembly may be reduced in the service life or lubrication performance thereof.

There is another problem that when the roller is not rotated, the oil is not supplied from the recess to space between the roller end face and the rib so that the frictional torque is increased immediately after the start of rotation of the roller.

The invention is directed to solution to the foregoing problems and accomplished defying the common knowledge of the prior art. The invention has an object to provide an oil-lubricated roller bearing assembly capable of enhancing the lubrication performance without storing the oil on the roller end face.

According to the invention for achieving the above object, an oil-lubricated roller bearing assembly comprising: an inner ring, an outer ring and a roller rollably interposed between these inner and outer rings, at least one of the inner ring and outer ring being formed with a rib making contact with an end face of the roller for guiding the rolling motion of the roller, the roller formed with a recess centrally of the end face thereof, the roller bearing assembly is characterized in that a stopper member for preventing oil invasion is fitted in the recess of the roller.

According to the invention, the stopper member for preventing the oil invasion prevents the recess formed in the roller end face from holding the oil therein so that the rotation of the roller may drive the oil into movement along the roller end face for oil supply to space between the roller and the rib. Thus is achieved the enhanced lubrication performance. Therefore, the frictional torque may be reduced during the rotation of the roller and a stable rotational torque may be accomplished even under a low lubrication condition where the oil is decreased to a small quantity or where the quantity of oil is purposefully decreased. In addition, the bearing assembly is less susceptible to seizure between the rib and the roller end face. Since the foreign substances such as wear particles are not accumulated in the recess, the bearing assembly is prevented from suffering the invasion of a substantial mass of the foreign substances into space between the roller and the inner ring or between the roller and the outer ring.

In a state where the roller is not rotated, as well, the oil is allowed to move along the end face of the roller, so that the oil may be supplied to space between the roller end face and the rib. Therefore, the frictional torque may be reduced immediately after the start of rotation of the roller.

In a roller manufacture process in which the roller end face is subjected to grinding before the stopper member is fitted in the recess, the manufacture process negates the need for grinding the central portion of the end face because the recess is formed centrally of the roller end face. That is, an area to be grinded is reduced, and the recess is prevented from leaving the minor bulge centrally of the roller end face. In addition, the post-grinding operation of removing the minor bulge is unnecessary. Since there is no minor bulge before the stopper member is fitted in the roller end face, the end face previously formed with the recess and grinded may be used as the measurement reference plane. This facilitates the measurement of the axial dimension of the roller.

It is preferred that the recess is formed in a manner that an opening edge of the recess does not overlap with the rib and that the stopper member is fitted in the recess in a manner not to make contact with the rib. This constitution prevents the lubrication performance from being lowered by the stopper member making contact with the rib. Furthermore, the constitution permits an outside circumferential edge of the grinded roller end face to make a proper contact with the rib via the oil.

It is also preferred that an outside end face of the stopper member is formed to project from the end face of the roller formed with the recess. This constitution provides a natural flow of the oil along the outside end face of the stopper member and the roller end face even when the roller is not rotated. Thus, the oil may be supplied to space between the roller end face and the rib. Therefore, the frictional torque may also be reduced immediately after the start of rotation of the roller.

The roller may be a tapered roller.

BEST MODES FOR CARRYING OUT THE INVENTION

The embodiments of the invention will hereinbelow be described with reference to the accompanying drawings.

Figure 1:
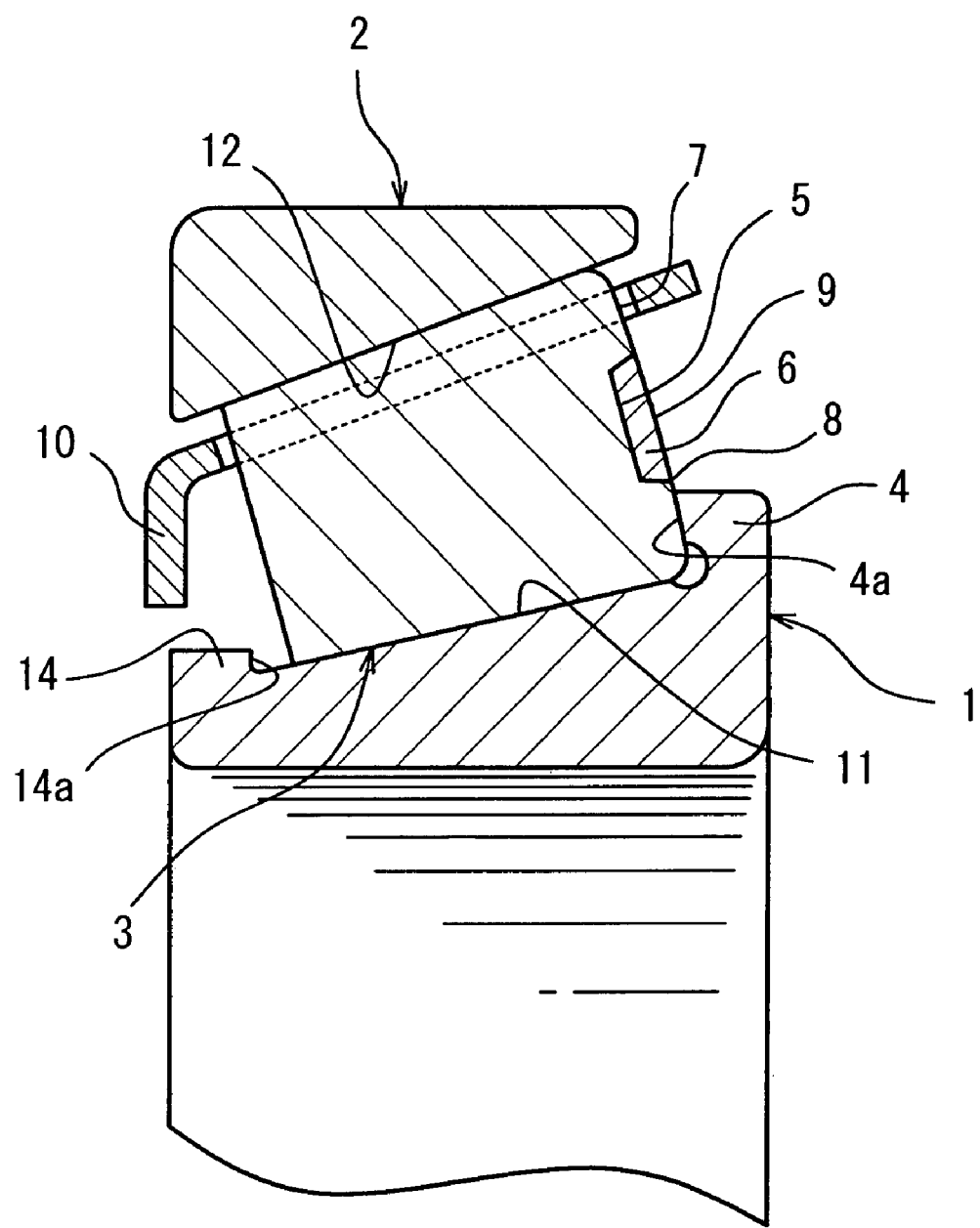
FIG. 1 is a vertical sectional view showing a roller bearing assembly according to one embodiment of the invention.

FIG. 1 is a vertical sectional view showing an oil-lubricated roller bearing assembly according to one embodiment of the invention. The bearing assembly includes: an inner ring 1; an outer ring 2; and a rolling element rollably interposed between the inner ring 1 and the outer ring 2. The rolling element includes a plurality of tapered rollers 3, constituting a tapered roller bearing. This roller bearing assembly is of an oil-lubricated type wherein a lubricant (oil) is applied between the inner ring 1 and the rollers 3 and between the outer ring 2 and the rollers 3 such as to reduce frictional torque in the rotation of the bearing assembly. The rollers 3 are retained by a cage 10.

The inner ring 1 is formed with a tapered raceway 11 on an outer periphery thereof, and is further formed with ribs 4, 14 at opposite end portions thereof with respect to an axial direction of the raceway 11. A greater end face 7 on a greater-diameter side of the roller 3 is in contact with the rib 4 on the greater-diameter side, whereby the rolling motion of the rollers 3 is guided. Specifically, a circumferential groove on the outer periphery of the inner ring 1 is defined by the raceway 11 making contact with an outer periphery of the roller 3; an inside abutment surface 4a of the greater rib 4 projecting radially outwardly from one end of the raceway 11; and an inside abutment surface 14a of the smaller rib 14 projecting radially outwardly from the other end of the raceway 11. The inside surface 4a of the greater rib 4 is in contact with a circumferential edge of the greater end face 7 of the roller 3.

The outer ring 2 is disposed radially outwardly of the inner ring 1 and has a raceway 12 formed on an inner periphery thereof and making contact with the outer periphery of the roller 3.

A recess 5 is formed centrally of the end face of the roller 3, on which the roller 3 makes contact with the rib 4 of the inner ring 1. That is, the recess 5 is formed centrally of the greater end face 7 of the roller 3. In a cutting (machining) process of the roller 3, the recess 5 is also cut to be formed on the greater end face 7 about an axis of the roller 3. The greater end face 7 of the roller 3 is finished by grinding its circumferential edge defining an area radially outwardly of the recess 5. This grinded area (a part) of the greater end face 7 makes a sliding contact with the rib 4 of the inner ring 1. In other words, a central area of the greater end face 7 where the recess 5 is formed need not be grinded. The recess 5 is formed as a circular dent, the depth of which is defined to be smaller than a radius thereof.

Figure 2:
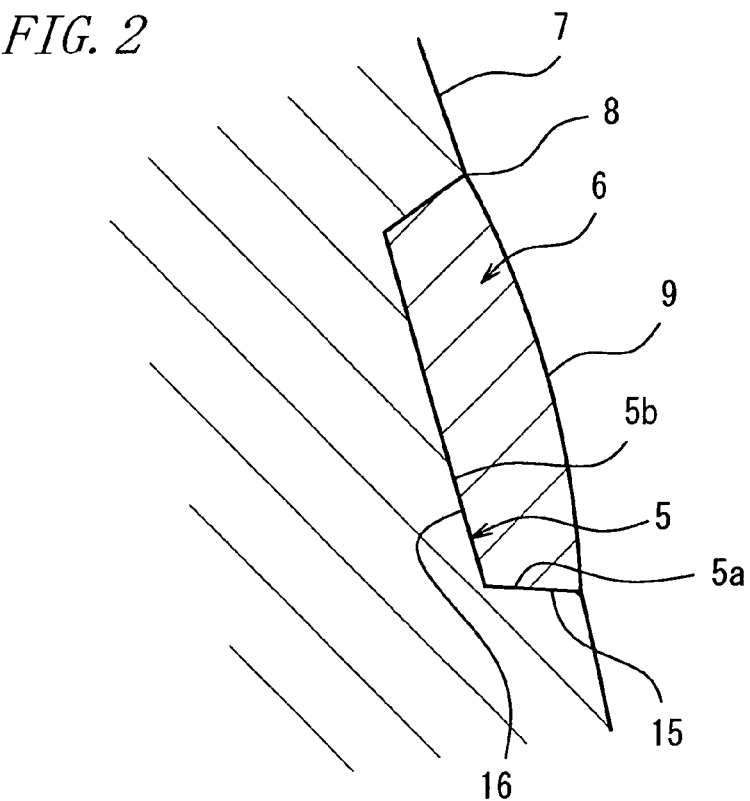
FIG. 2 is a sectional view of an essential part, showing a stopper member fixed in a recess.

As shown in FIG. 2, a stopper member 6 is fixed in the recess 5 for preventing the oil from invading into the recess 5. The stopper member 6 serves to block the oil flow (invasion) into the recess 5 and is fitted in the recess 5.

While the stopper member 6 may be formed from a resin material such as urethane resin or from a metal, the stopper member may preferably be formed from a less hard material such as to be less liable to fall off (separate) from the recess 5. The stopper member may preferably be fixed to place by way of means less liable to fall off. It may also be contemplated to fix the stopper member 6 to the roller 3 by means of a separate fixing member (not shown) such as a screw or pin. However, the constitution wherein the stopper member 6 is fitted in the recess 5 without using such a fixing member is more preferred from the viewpoint of a simplified manufacture process.

The stopper member 6 may be formed as follows. In a case where the stopper member 6 is formed from a resin material, for example, a dispenser may be used to feed a molten resin material into the recess 5 of the roller 3 finished with the grinding process and the resin material may be cured to form the stopper member 6.

Referring to FIG. 2, a side peripheral surface 15 of the stopper member 6 is in tight contact with an inner periphery 5a of the recess 5, while an inside end face 16 of the stopper member 6 is in tight contact with a bottom 5b of the recess 5.

Referring to FIG. 2, the inner periphery 5a of the recess 5 formed in the roller 3 is defined by a tapered periphery progressively increased in diameter toward outside (from the inner-most side toward an opening edge 8). Alternatively, the inner periphery 5a may also be defined by a cylinder extending linearly in parallel to the axis of the roller 3. Conversely, the inner periphery 5a may also be defined by a tapered periphery (not shown) progressively decreased in diameter toward outside. Such configurations make the stopper member 6 less liable to fall off from the recess 5.

Moreover, as shown in FIG. 1, the recess 5 in the greater end face 7 of the roller 3 is formed in a manner that the opening edge 8 of the recess 5 does not overlap with the inside abutment surface 4a of the rib 4. In the meantime, the stopper member 6 is fixed in the recess 5 in a manner that an outside end face 9 thereof does not make contact with the inside abutment surface 4a of the rib 4. In short, the recess 5 of the roller 3 is located radially outwardly of the inside abutment surface 4a of the rib 4 of the inner ring 1.

According to the above roller bearing assembly, the constitution is not made such that the oil (lubricant) is stored in the recess 5 so as to be supplied to the rib 4 by way of the centrifugal force associated with the rotation of the roller 3. The above roller bearing assembly is constituted such that the stopper member 6 is fitted in the recess 5 so as to prevent the oil from being stored in the recess 5, thereby promoting the movement of the oil on the greater end face 7 of the roller 3 and the circulation of the oil. That is, the above roller bearing assembly is adapted for efficient supply of the oil to space between the roller 3 and the rib 4. Hence, the circumferential edge of the greater end face 7 of the grinded roller 3 may make a proper contact with the inside abutment surface 4a of the rib 4 via the oil, thus favorably sliding thereon.

The oil is prevented from dwelling in the recess 5 by disposing the stopper member 6 in the recess 5 formed in the greater end face 7 of the roller 3, so that the rotation of the roller 3 may drive the oil into movement along the greater end face 7 of the roller 3. That is, the oil is supplied to space between the greater end face 7 of the roller 3 and the inside abutment surface 4a of the rib 4 so as to enhance the lubrication performance. This leads to the reduction of the frictional torque during the rotation of the roller 3, the stabilized rotational torque, and the reduced proneness of seizure between the rib 4 and the greater end face 7 of the roller 3. Furthermore, the accumulation of the foreign substances such as wear particles may be prevented.

Figure 3:
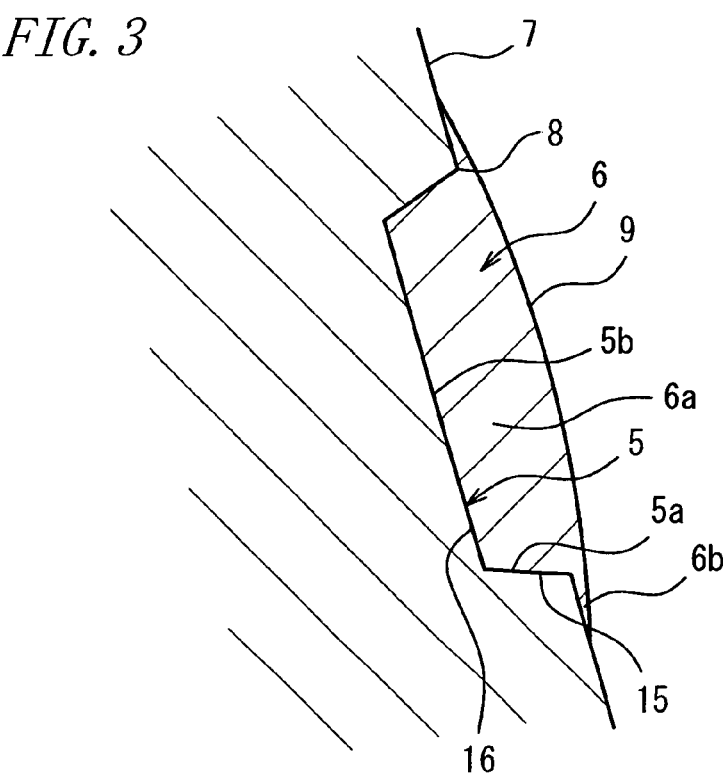
FIG. 3 is a sectional view of the essential part, showing an exemplary modification of the stopper member.

FIG. 3 is a sectional view showing an exemplary modification of the stopper member 6. As shown in FIG. 2 and FIG. 3, the outside end face 9 of the stopper member 6 is so formed as to project from the greater end face 7 of the roller 3 formed with the recess 5. The outside end face 9 is formed in a convex configuration with spherical surface (curved surface).

The stopper member 6 of FIG. 2 has a configuration wherein the outside end face 9 has a contour shape (shape of outside circumference) corresponding to a shape of the opening edge 8 of the recess 5. The stopper member 6 of FIG. 3 includes a main body 6a fitted in the recess 5, and a cover portion 6b having a contour shape (shape of outside circumference) larger than the shape of the opening edge 8 of the recess 5. The cover portion 6b defining the portion projected from the greater end face 7 of the roller 3 has the contour shape (diameter) greater than the shape (diameter) of the opening edge 8 of the recess 5, thus completely covering the recess 5.

The constitutions illustrated by the embodiments of FIG. 2 and FIG. 3 provide a natural flow of the oil along the outside end face 9 of the stopper member 6 and the greater end face 7 of the roller 3 even in a state where the roller 3 is not rotated, so that the oil may be supplied to space between the greater end face 7 of the roller 3 and the inside abutment surface 4a of the rib 4. Therefore, the frictional torque may also be reduced immediately after the start of rotation of the roller 3.

Figure 4:
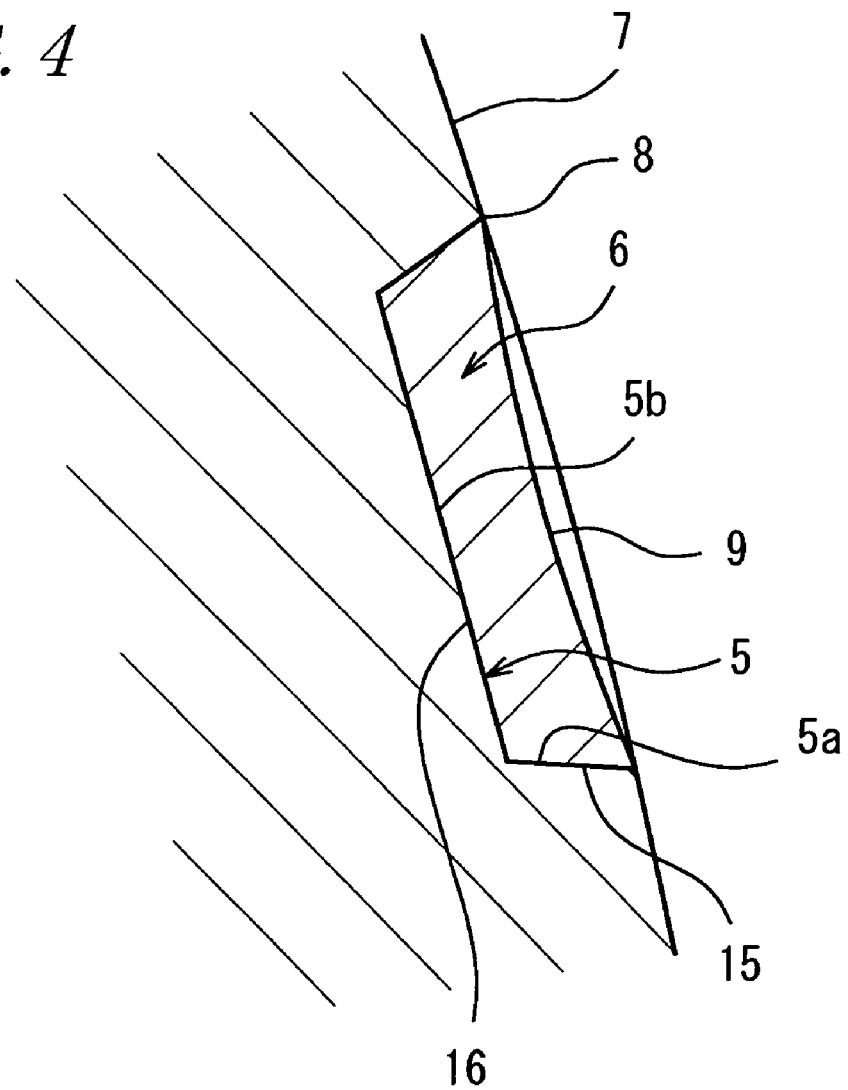
FIG. 4 is a sectional view of the essential part, showing another exemplary modification of the stopper member.
Figure 5:
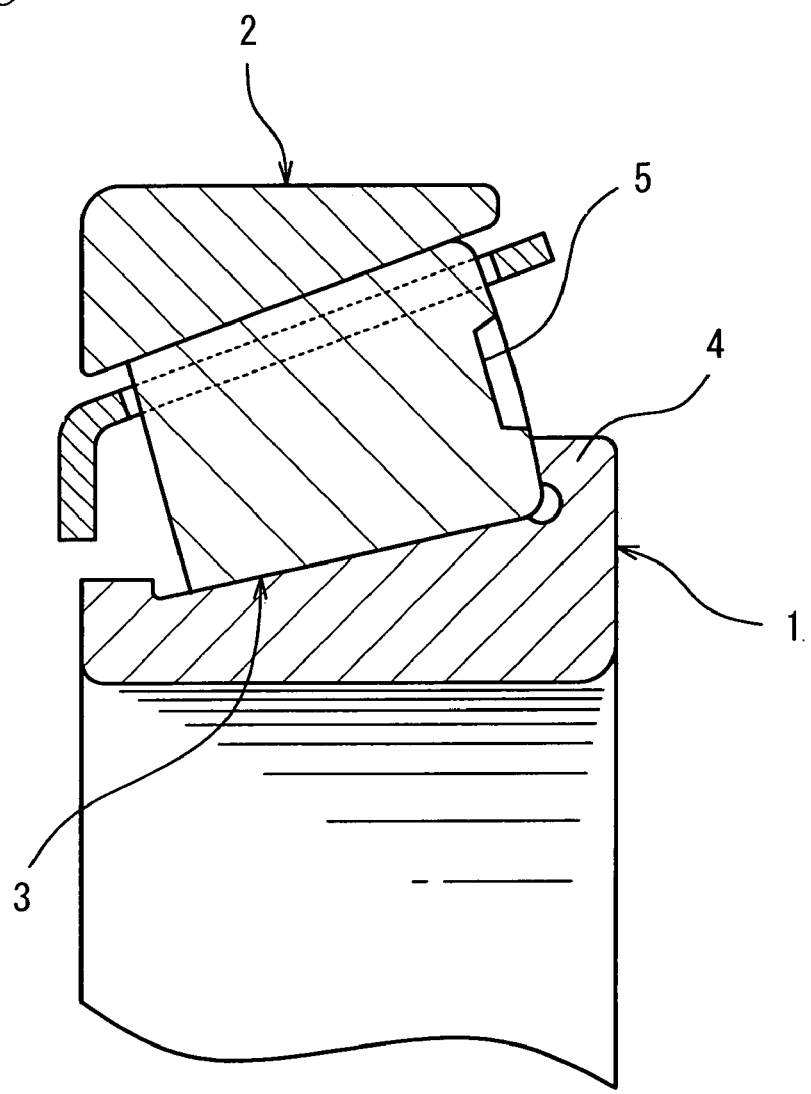
FIG. 5 is a vertical sectional view showing a conventional roller bearing assembly.
Figure 6:
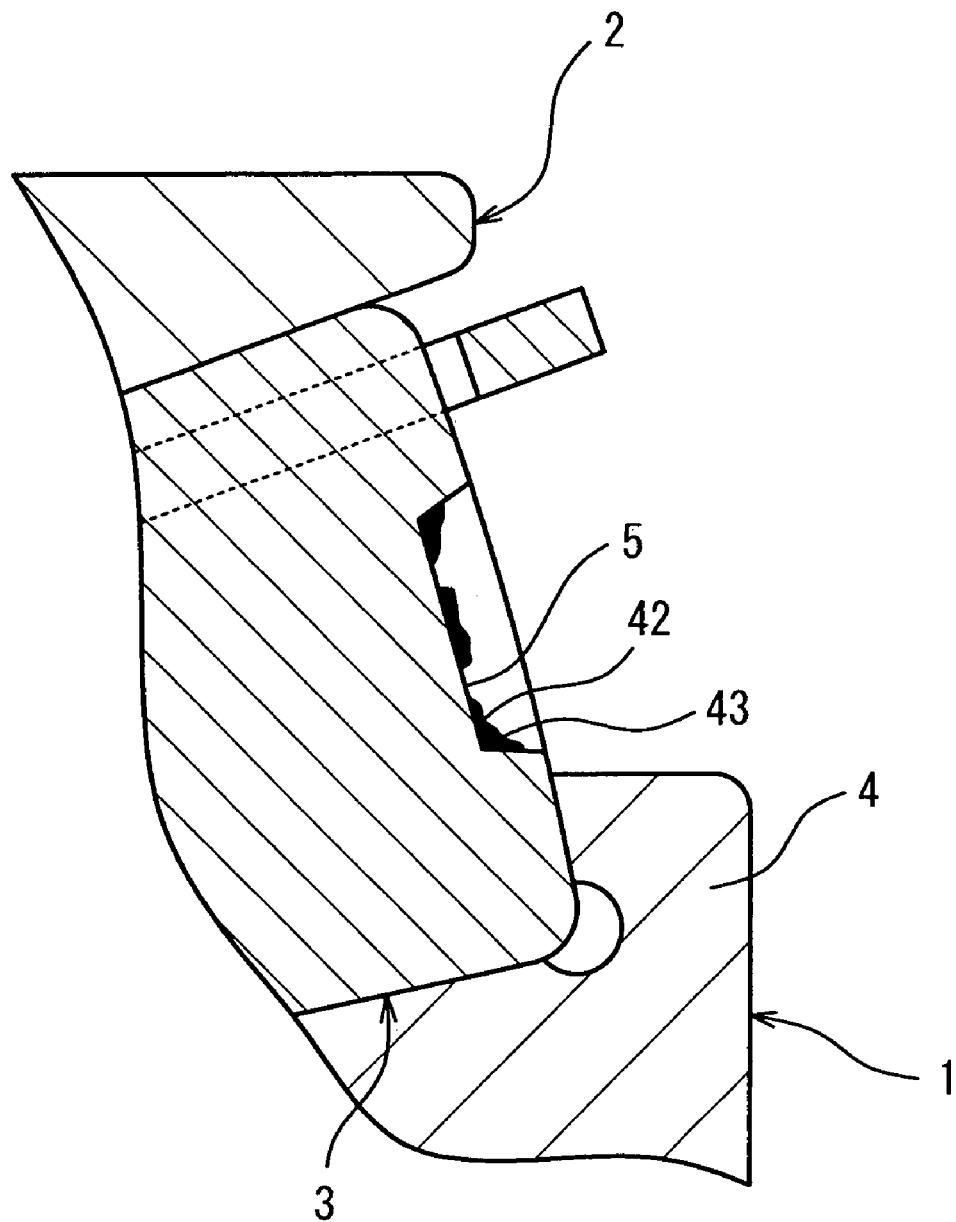
FIG. 6 is a sectional view showing an essential part of FIG. 5.

The outside end face 9 of the stopper member 6 is so configured as to prevent the accumulation of the oil and wear particles, thereby permitting the oil to move along the outside end face 9 of the stopper member 6 and the greater end face 7 of the roller 3. As shown in FIG. 4 illustrating another exemplary modification of the stopper member 6, the stopper member 6 may also have a configuration wherein the outside end face 9 thereof is formed to define a slightly concaved curved surface (spherical surface). In this constitution, the outside end face 9 of the stopper member 6 is slightly recessed from the greater end face 7 of the roller 3. This constitution is adapted to prevent the outside end face 9 of the stopper member 6 from making contact with the cage 10.

The oil-lubricated roller bearing assembly of the invention is not limited to the illustrated embodiments and may be practiced in any other modes within the scope of the invention. Instead of being projected or recessed from the greater end face 7 of the roller 3, the outside end face 9 of the stopper member 6, for example, may also be configured to define one continuous smooth surface (not shown) jointly with the greater end face 7 of the roller 3.

While the bearing assembly of FIG. 1 has the constitution wherein the inner ring 1 is formed with the rib 4 for guiding the roller 3, the constitution of the bearing assembly is not limited to this. Alternatively, the outer ring 2 may be formed with the rib 4. What is important is that at least one of the inner ring 1 and the outer ring 2 is formed with the rib 4.

The invention is also applicable to various types of roller bearing assemblies such as a cylindrical roller bearing assembly including a column-like roller, and a self-aligning roller bearing assembly. The formation of the recess 5 is not limited to one of the end faces of the roller 3. The recess may also be formed on the other end face of the roller. The stopper member 6 may be fixed in the recesses 5 in the opposite end faces of the roller.

The roller bearing assembly constituted as described above may be applied as follows, for example. In a unit wherein a pinion shaft having a pinion gear mounted to one end thereof is carried in a housing via a rolling bearing assembly, the tapered roller bearing assembly according to any one of the foregoing embodiments may be used as the rolling bearing assembly. Such a unit may be exemplified by a vehicular pinion-shaft supporting unit. Specific examples of such a unit include: a differential gear unit wherein the above pinion shaft constitutes a drive gear and the above housing constitutes a differential case; and a transaxle unit including the differential gear unit and a transmission unit. In these applications, the aforementioned effects to suppress the accumulation of foreign substances and to reduce torque immediately after the start of rotation are particularly remarkable.

According to the invention as described above, the lubrication performance may be enhanced because the accumulation of the oil and the foreign substances such as grinding dust and wear particles in the recess 5 is prevented so that the oil is efficiently supplied to space between the roller end face and the rib 4 even under a low lubrication condition where a small quantity of oil is present.

What is claimed is:

1. An oil-lubricated roller bearing assembly comprising: an inner ring, an outer ring and a roller rollably interposed between these inner and outer rings, at least one of the inner ring and outer ring being formed with a rib making contact with an end face of the roller for guiding the rolling motion of the roller, the roller formed with a recess centrally of the end face thereof, the roller bearing assembly wherein a stopper member for preventing oil invasion is fitted in the recess of the roller, wherein an inner periphery of the recess is defined by a tapered periphery progressively increased in diameter from an inner most side of the recess toward an opening edge of the recess, and wherein the stopper member has a top surface facing away from the roller and the recess, and the top surface of the stopper member within a width range of the opening edge of the recess is convex or concave.

2. The oil-lubricated roller bearing assembly according to claim 1, wherein the recess is formed in a manner that the opening edge of the recess does not overlap with the rib, and wherein the stopper member is fitted in the recess in a manner not to make contact with the rib.

3. The oil-lubricated roller bearing assembly according to claim 2, wherein an outside end face of the stopper member is formed to project from the end face of the roller formed with the recess.

4. The oil-lubricated roller bearing assembly according to claim 2, wherein the roller is a tapered roller.

5. The oil-lubricated roller bearing assembly according to claim 1, wherein an outside end face of the stopper member is formed to project from the end face of the roller formed with the recess.

6. The oil-lubricated roller bearing assembly according to claim 5, wherein the roller is a tapered roller.

7. The oil-lubricated roller bearing assembly according to claim 1, wherein the roller is a tapered roller.

8. The oil-lubricated roller bearing assembly according to claim 1, wherein a bottom surface of the recess that is deepest from the end face of the roller in an axial direction of the roller is substantially parallel to the end face of the roller.

9. The oil-lubricated roller bearing assembly according to claim 8, wherein the stopper member fully covers the entire bottom face of the recess.

10. The oil-lubricated roller bearing assembly according to claim 8, wherein the opening edge extends from the end face of the roller and ends at the bottom surface of the recess, and the stopper member fully covers the entire opening edge.

11. The oil-lubricated roller bearing assembly according to claim 1, wherein the stopper member is formed from a resin material, a molten resin material is fed into the recess, and the molten resin material in the recess is cured to form the stopper member.

12. An oil-lubricated roller bearing assembly comprising: an inner ring, an outer ring and a roller rollably interposed between these inner and outer rings, at least one of the inner ring and outer ring being formed with a rib making contact with an end face of the roller for guiding the rolling motion of the roller, the roller formed with a recess centrally of the end face thereof, the roller bearing assembly wherein a stopper member for preventing oil invasion is fitted in the recess of the roller, wherein an inner periphery of the recess is defined by a cylinder extending linearly in parallel to an axis of the roller, and wherein the stopper member has a convex surface or a concave surface within a width range of an opening edge of the recess, wherein the stopper member has a top surface facing away from the roller and the recess.

13. The oil-lubricated roller bearing assembly according to claim 12, wherein the stopper member is formed from a resin material, a molten resin material is fed into the recess, and the molten resin material in the recess is cured to form the stopper member.

* * * * *